(12) United States Patent
Kai

(10) Patent No.: US 12,010,435 B2
(45) Date of Patent: Jun. 11, 2024

(54) IMAGE PICK-UP APPARATUS, IMAGE PICK-UP METHOD THAT PICKS UP IMAGES FOR A VISUAL SIMULTANEOUS LOCALIZATION AND MAPPING

(71) Applicant: NEC Corporation, Tokyo (JP)

(72) Inventor: Natsuki Kai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 224 days.

(21) Appl. No.: 17/611,636

(22) PCT Filed: Feb. 26, 2020

(86) PCT No.: PCT/JP2020/007560
§ 371 (c)(1),
(2) Date: Nov. 16, 2021

(87) PCT Pub. No.: WO2020/235167
PCT Pub. Date: Nov. 26, 2020

(65) Prior Publication Data
US 2022/0247922 A1    Aug. 4, 2022

(30) Foreign Application Priority Data
May 23, 2019    (JP) .................................. 2019-096938

(51) Int. Cl.
*H04N 23/80*    (2023.01)
*G06T 7/80*    (2017.01)
*H04N 23/63*    (2023.01)

(52) U.S. Cl.
CPC .............. *H04N 23/80* (2023.01); *G06T 7/80* (2017.01); *H04N 23/63* (2023.01); *G06T 2207/20182* (2013.01)

(58) Field of Classification Search
CPC ........ H04N 23/80; H04N 23/63; H04N 23/60; G06T 7/80; G06T 2207/20182;
(Continued)

(56) References Cited

U.S. PATENT DOCUMENTS 9,530,208 B1 * 12/2016 Ivanchenko .......... G06T 3/0068
2012/0044348 A1 * 2/2012 Pijl ........................... G06T 7/74
348/135

(Continued)

FOREIGN PATENT DOCUMENTS

JP    2006-245709 A    9/2006
JP    2012-015973 A    1/2012
(Continued)

OTHER PUBLICATIONS

International Search Report for PCT Application No. PCT/JP2020/007560, dated Apr. 7, 2020.

*Primary Examiner* — Luong T Nguyen
(74) *Attorney, Agent, or Firm* — Sughrue Mion, PLLC

(57) ABSTRACT

To provide an image pick-up apparatus, an image pick-up method, and a program each of which adapted to perform photometric calibration at a low cost in the application thereof for picking-up images for performing localization. An image pick-up apparatus (500) includes at least one memory (503) configured to store an instruction, and at least one processor (502) configured to execute the instruction, the processor being further configured to: pick-up an image; determine whether the picked-up image data is an image suitable for a computer vision application; and adjust camera parameters based on the determination.

4 Claims, 5 Drawing Sheets

(58) Field of Classification Search
CPC ......... G06T 7/0002; G06T 2207/30168; G06T 2207/30244
See application file for complete search history.

(56) References Cited

U.S. PATENT DOCUMENTS

2017/0069096 A1\* 3/2017 Cameron .................. G06T 7/32
2017/0147003 A1\* 5/2017 Karlsson ................... G06T 7/70
2017/0302838 A1\* 10/2017 Yang ........................ G06T 7/49

FOREIGN PATENT DOCUMENTS

| JP | 2016-527583 A | 9/2016 |
| JP | 2020-008853 A | 1/2020 |
| WO | 2015/165523 A1 | 11/2015 |

\* cited by examiner

IMAGE PICK-UP APPARATUS, IMAGE PICK-UP METHOD THAT PICKS UP IMAGES FOR A VISUAL SIMULTANEOUS LOCALIZATION AND MAPPING

This application is a National Stage Entry of PCT/JP2020/007560 filed on Feb. 26, 2020, which claims priority from Japanese Patent Application 2019-096938 filed on May 23, 2019, the contents of all of which are incorporated herein by reference, in their entirety.

TECHNICAL FIELD

The present disclosure relates to an image pick-up apparatus, an image pick-up method, and a storage medium, for instance, an image pick-up apparatus that picks up images for Visual SLAM using an auto-tuning camera such as a smartphone, an image pick-up method, and a storage medium.

BACKGROUND ART

In recent years, a technique for estimating self-position (localization) even in an environment where a GPS (Global Positioning System) signal is not available is being actively developed. As an example of such a technique, Visual SLAM (Visual Simultaneous Localization And Mapping), which is a technique of simultaneously performing localization and creation of a 3D map from a two-dimensional image picked-up by a moving camera, is known. Visual SLAM is broadly categorized as a direct method of directly referencing pixel values and an indirect method of extracting feature points from an image.

In the Visual SLAM technique described above, in order to create an accurate and high-quality SLAM map, it is necessary to perform an initialization process to properly adjust the camera parameters.

In the initialization process performed in the Visual SLAM, in order to estimate the camera matrix including the internal parameters of the camera, the location of an object represented by points in a picked-up image is identified while moving the camera. In this process, subtle differences in the conditions, such as the shooting method and how the camera is moved, greatly affect the estimation accuracy of the camera matrix.

In Patent Literature 1, a method for facilitating initialization of SLAM is proposed in which whether or not a camera is pivoted (moved) in a correct direction is determined, and when it is detected that the camera is moved in an improper direction, the user is notified of the proper direction.

CITATION LIST

Patent Literature

Patent Literature 1: Published Japanese Translation of PCT International Publication for Patent Application, No. 2016-527583

SUMMARY OF INVENTION

Technical Problem

In the existing Visual SLAM, work has been performed to create a SLAM map using videos shot with an industrial camera equipped with a CCD sensor as input. Photometric calibration for acquiring a value of a photometric sensor and modeling optical attenuation characteristics of a lens to thereby correct optical distortion is proposed in Visual SLAM technique in which an industrial camera is used, however this method has a problem that an industrial camera is expensive.

On the other hand, cameras installed in smartphones and commercially-available webcams are inexpensive compared to industrial cameras. However, in the case of these cameras, accuracy of a photometric sensor for performing optical correction by image processing is low or the result of the measurement by a photometric sensor cannot be acquired, and thus there has been a problem that it is difficult to perform photometric calibration with these cameras.

As explained above, in the application of picking-up images for performing localization, an image pick-up apparatus that enables photometric calibration at a low cost has not been realized.

Solution to Problem

An image pick-up apparatus according to an example embodiment includes:
  an image pick-up unit for which camera parameters for performing image pick-up are adjustable;
  a determination unit configured to determine whether image data picked up by the image pick-up unit is an image suitable for a computer vision application; and
  a parameter adjustment unit configured to adjust the camera parameters based on the determination performed by the determination unit.

An image pick-up method according to an example embodiment includes:
  picking-up an image;
  determining whether the picked-up image data is an image suitable for a computer vision application; and
  adjusting camera parameters based on the determination.

A computer-readable storage medium according to an example embodiment stores a program for causing a computer to perform the steps of:
  picking-up an image;
  determining whether the picked-up image data is an image suitable for a computer vision application; and
  adjusting camera parameters based on the determination.

Advantageous Effects of Invention

According to an image pick-up apparatus, an image pick-up method, and a storage medium of the present disclosure, photometric calibration can be performed at a low cost in the application thereof for picking-up images for performing localization. As a result, accuracy of the localization can be improved in the application thereof for picking-up images for performing localization using a simple camera.

DESCRIPTION OF EMBODIMENTS

First Example Embodiment

Figure 1:
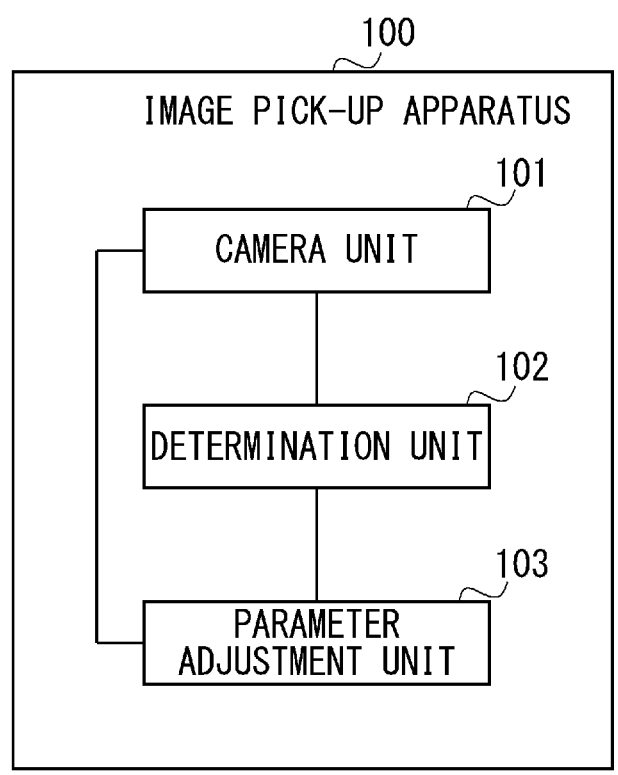
FIG. 1 is a block diagram showing a schematic configuration of an image pick-up apparatus according to a first example embodiment.

Hereinbelow, example embodiments of the present disclosure will be described with reference to the drawings. FIG. 1 is a block diagram showing a schematic configuration of an image pick-up apparatus according to a first example embodiment. In FIG. 1, an image pick-up apparatus 100 includes a camera unit 101, a determination unit 102, and a parameter adjustment unit 103.

The camera unit 101 is an image pick-up unit for which the camera parameters such as the focus and the exposure time of the image pick-up apparatus are adjustable. For instance, the camera unit 101 includes a lens, a diaphragm, a shutter, and an image pick-up device. Specifically, the camera unit 101 may be a camera installed in a smartphone or a simple webcam for which the camera parameters such as the focus and the exposure time can be set variably.

The camera unit 101 picks up an image in accordance with the set camera parameters and outputs the picked-up image to the determination unit 102.

The determination unit 102 determines whether the image picked-up by the camera unit 101 is an image suitable for a computer vision application for processing picked-up images. Then, the determination unit 102 outputs the result of the determination to the parameter adjustment unit 103.

The parameter adjustment unit 103 adjusts the camera parameters of the camera unit 101 based on the result of the determination performed by the determination unit 102. Then, the parameter adjustment unit 103 sets the adjusted camera parameters to the camera unit 101.

As described above, according to the image pick-up apparatus according to the first example embodiment, it is determined as to whether or not the picked-up image is an image suitable for the computer vision application, and based on the result of the determination, the camera parameters of the camera which picks up images are adjusted, whereby photometric calibration can be performed at a low cost in application of the image pick-up apparatus for picking up images for performing localization. Further, according to the image pick-up apparatus according to the first example embodiment, accuracy of the localization can be improved when images for performing localization are picked-up using a simple camera.

Each of the determination unit 102 and the parameter adjustment unit 103 mentioned above may be configured of an electronic circuit. Further, each of the determination unit 102 and the parameter adjustment unit 103 mentioned above may be configured of an integrated circuit such as ASIC (Application Specific Integrated Circuit) or FPGA (Field-Programmable Gate Array). Further, each of the determination unit 102 and the parameter adjustment unit 103 mentioned above may include a CPU (Central Processing Unit) and a memory.

Note that in the image pick-up apparatus according to the first example embodiment, adjustment of the camera parameters can be performed at any timing, and it is preferably performed in the initial process before the image pick-up process.

Second Example Embodiment

Figure 2:
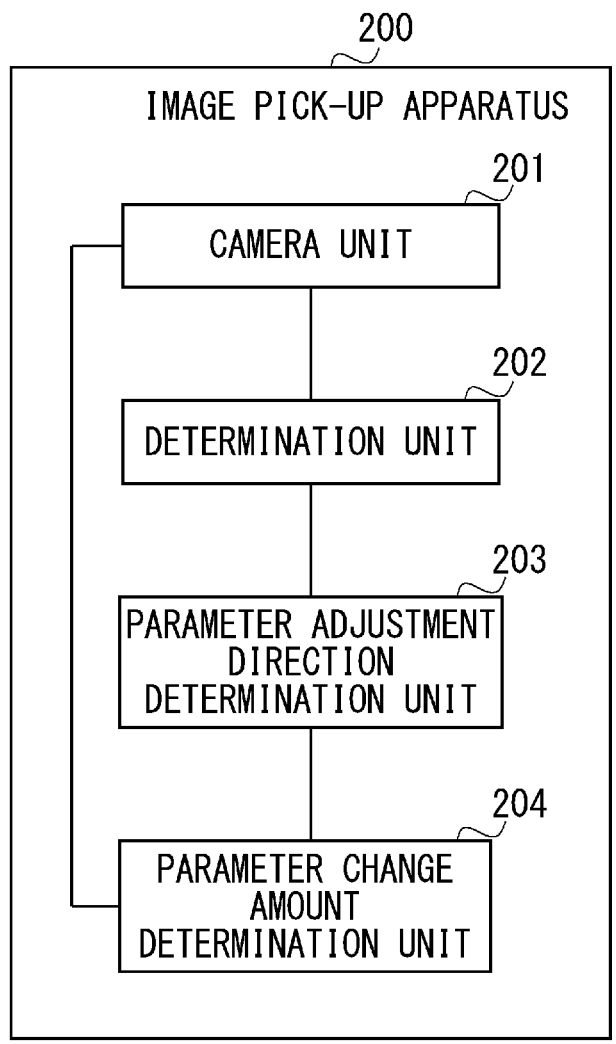
FIG. 2 is a block diagram showing a schematic configuration of an image pick-up apparatus according to a second example embodiment.

In a second example embodiment, the content of adjustment performed in the first example embodiment will be described in more detail. FIG. 2 is a block diagram showing a schematic configuration of an image pick-up apparatus according to a second example embodiment. As shown in FIG. 2, an image pick-up apparatus 200 includes a camera unit 201, a determination unit 202, a parameter adjustment direction determination unit 203, and a parameter change amount determination unit 204. The parameter adjustment direction determination unit 203 and the parameter change amount determination unit 204 are detailed configurations of the parameter adjustment unit 103 described in the first example embodiment.

The camera unit 201 is an image pick-up unit for which the camera parameters such as the focus and the exposure time of the image pick-up apparatus are adjustable. For instance, like the camera unit 101, the camera unit 201 includes a lens, a diaphragm, a shutter, and an image pick-up device. Specifically, the camera unit 201 may be a camera installed in a smartphone or a simple webcam for which the camera parameters such as the focus and the exposure time can be set variably.

The camera unit 201 picks up an image in accordance with the set camera parameters and outputs the picked-up image to the determination unit 202.

The determination unit 202 determines whether the image picked-up by the camera unit 201 is an image suitable for the Visual SLAM. For instance, the determination unit 202 performs at least one of edge determination, blur determination, and noise determination. In the following description, an example in which the determination unit 202 performs determination by combining the edge determination, the blur determination, and the noise determination will be described. The determination unit 202 outputs the determination result to the parameter adjustment direction determination unit 203.

The parameter adjustment direction determination unit 203 determines the adjustment direction of each camera parameter based on the result of the determination performed by the determination unit 202. The camera parameters include at least one of exposure time, ISO sensitivity, and focal length. Further, the camera parameters may be a white balance or an F-number.

The parameter adjustment direction determination unit 203 determines which parameter among the plurality of the camera parameters is to be raised or lowered (increased or decreased) in its value.

The parameter change amount determination unit 204 determines the change amount of each camera parameter based on the result of the determination performed by the determination unit 202 and sets new camera parameters to the camera unit 201 in accordance with the result of the determination performed by the parameter change amount determination unit 204 and the result of the determination performed by the parameter adjustment direction determination unit 203.

Each of the determination unit 202, the parameter adjustment direction determination unit 203, and the parameter change amount determination unit 204 mentioned above may be configured of an electronic circuit. Further, each of the determination unit 202, the parameter adjustment direction determination unit 203, and the parameter change amount determination unit 204 mentioned above may be configured of an integrated circuit such as ASIC or FPGA. Further, each of the determination unit 202, the parameter adjustment direction determination unit 203, and the parameter change amount determination unit 204 mentioned above may include a CPU and a memory.

Figure 3:
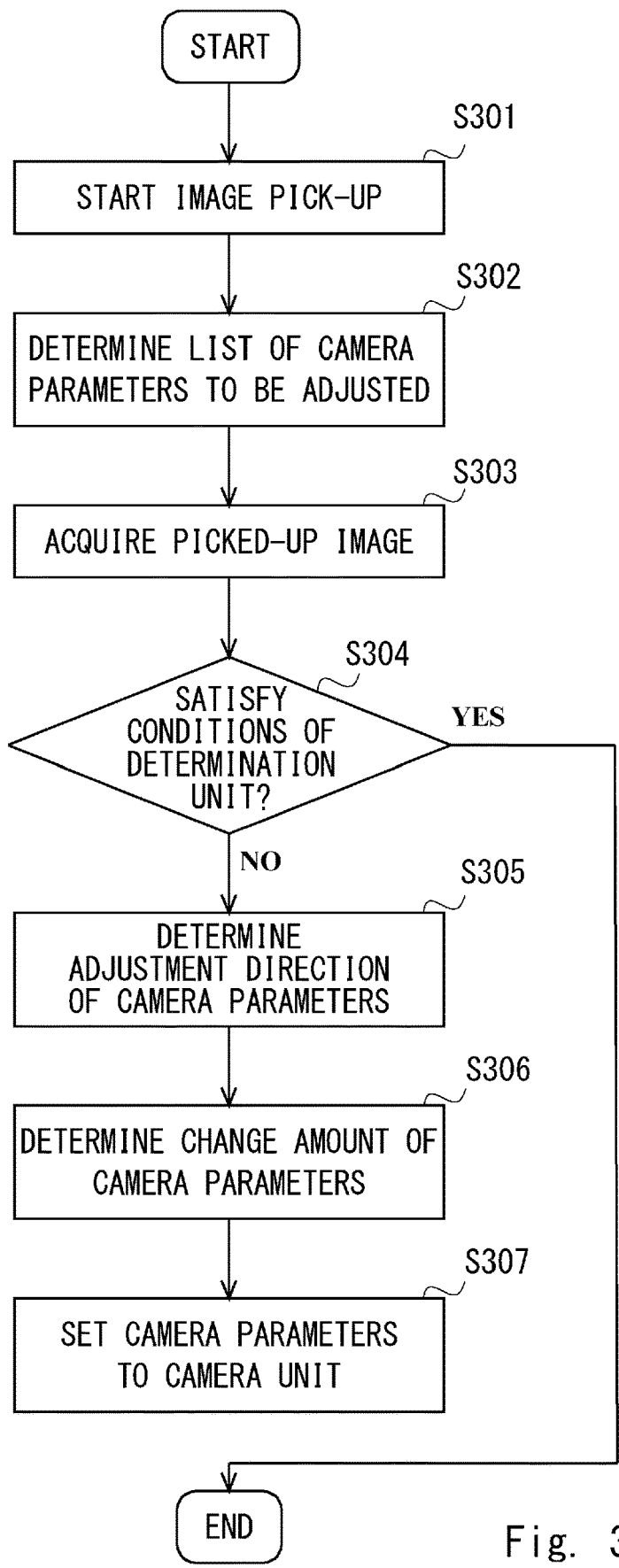
FIG. 3 is a flowchart showing an example of a schematic operation of the image pick-up apparatus 200 according to the second example embodiment.

With the aforementioned configuration, the image pick-up apparatus 200 adjusts the camera parameters. Next, an adjustment operation of the image pick-up apparatus 200 will be described. FIG. 3 is a flowchart showing an example of a schematic operation of the image pick-up apparatus 200 according to the second example embodiment.

First, in Step S301, shooting with a camera is started, and the user starts moving with the camera. Then, the processing proceeds to Step S302.

In Step S302, a list of the camera parameters to be adjusted is generated for the Visual SLAM which is the target computer vision application and then the processing proceeds to Step S303. The list of the camera parameters to be adjusted may include any camera parameters. For instance, the exposure time and the ISO sensitivity that are camera parameters effective in the Visual SLAM which uses the direct method are suitable as the camera parameters to be adjusted.

In Step S303, the camera unit 201 starts shooting in accordance with the camera parameters of default set values and transmits the image it has shot to the determination unit 202. Then the processing proceeds to Step S304. At this time, the user with the camera is assumed to move around after starting to shoot images with the camera. Since this is a technique in which the Visual SLAM calculates the location of the camera and the location thereof with respect to the surrounding as a result of the camera being moved around by the user, the SLAM map cannot be created while the camera is in a stationary state, and thus in the technique according to the present disclosure, it is necessary to move the camera in order to determine whether or not an image suitable for the Visual SLAM has been shot. Further, there is no need to provide a special fixing apparatus for moving the camera of the present disclosure, and the user can shoot the surrounding by any method.

In Step S304, the determination unit 202 determines whether the acquired image is an image suitable for the Visual SLAM. Then, when the acquired image is not an image suitable for the Visual SLAM, the processing proceeds to Step S305. When the acquired image is an image suitable for the Visual SLAM, the processing ends. The specific determination procedure will be described later.

In Step S305, the parameter adjustment direction determination unit 203 determines the items of the parameters for which the acquired image is not suitable for the Visual SLAM whereby the adjustment direction of the camera parameter is determined. Then, information related to the camera parameter to be adjusted and information related to the adjustment direction are output from the parameter adjustment direction determination unit 203 to the parameter change amount determination unit 204.

In Step S306, the parameter change amount determination unit 204 receives the information related to the camera parameter to be adjusted and the information related to the adjustment direction from the parameter adjustment direction determination unit 203. Then, the parameter change amount determination unit 204 determines the change amount of the camera parameter. Then the processing proceeds to Step S307.

In Step S307, the camera parameters of the camera unit 201 are set to the respective values to be changed to.

Figure 4:
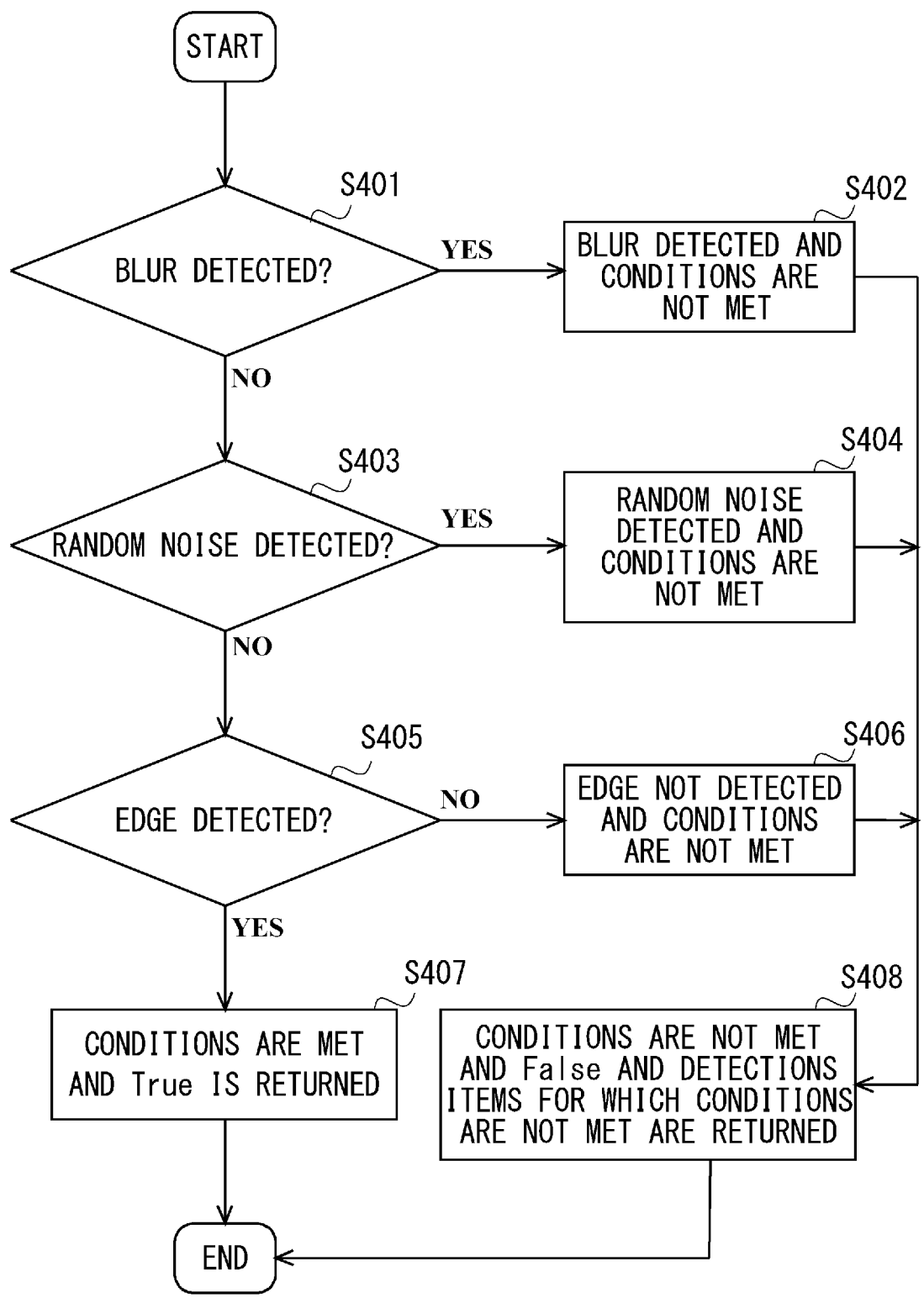
FIG. 4 is a flowchart showing an example of determination procedure of the image pick-up apparatus 200 according to the second example embodiment.

By the procedure described above, the image pick-up apparatus 200 adjusts the camera parameters. Next, a detailed determination procedure will be described. FIG. 4 is a flowchart showing an example of the determination procedure of the image pick-up apparatus 200 according to the second example embodiment.

First, in Step S401, the determination unit 202 performs the blur determination on the acquired image. When a blur is detected, the processing proceeds to Step S402. Alternatively, when a blur is not detected, the processing proceeds to Step S403.

In Step S402, the determination unit 202 determines that no blur is detected thereby failing to meet the conditions, and the processing proceeds to Step S408.

In Step S403, the determination unit 202 performs the random noise determination. When a random noise is detected, the processing proceeds to Step S404. Further, when no edge is detected, the processing proceeds to Step S405.

In Step S404, the determination unit 202 determines that a random noise is detected, thereby failing to meet the conditions, and the processing proceeds to Step S408.

In Step S405, the determination unit 202 performs the edge determination. When no edge is detected, the processing proceeds to Step S406. Alternatively, when an edge is detected, the processing proceeds to Step S407.

In Step S406, the determination unit 202 determines that no edge is detected, thereby failing to meet the conditions, and the processing proceeds to Step S408.

In Step S407, True indicating that the conditions are met is returned to the parameter adjustment direction determination unit 203, and the processing ends.

In Step S408, False indicating that the conditions are not met and the items of the detection for which the conditions are not met are returned to the parameter adjustment direction determination unit 203, and the processing ends. Note that any determination algorithm may be used in the blur determination in Step S401, the random noise determination in Step S403, and the edge determination in Step S405.

Next, the operation for determining the adjustment direction of the camera parameters based on the determination result and the operation for determining the set values of the camera parameters will be described in detail.

<Determination of Adjustment Direction of Camera Parameters>

The parameter adjustment direction determination unit 203 determines the adjustment direction of the camera parameters from the detection items for which it is determined that the conditions are not met and outputs the determined adjustment direction to the parameter change amount determination unit 204.

For instance, when the detection item for which it is determined that the conditions are not met is the blur determination, the parameter adjustment direction determination unit 203 determines the parameter adjustment direction to be in the direction for reducing the exposure time. Further, when the detection item for which it is determined that the conditions are not met is the random noise determination, the parameter adjustment direction determination unit 203 determines the parameter adjustment direction to be in the direction for lowering the ISO sensitivity. Further, when no edge is detected, the parameter adjustment direction determination unit 203 determines the parameter adjustment direction to be in the direction for increasing both the exposure time and the ISO sensitivity. The parameter adjustment direction determination unit 203 outputs the determined adjustment direction of the camera parameters to the parameter change amount determination unit 204.

<Set Values of Camera Parameters>

The parameter change amount determination unit 204 receives the camera parameters to be adjusted and the adjustment direction thereof from the parameter adjustment direction determination unit 203 and determines the change amount of the camera parameter. Then, based on the change amount, the parameter change amount determination unit 204 changes the set values of the corresponding camera parameters of the camera unit 201. For instance, the change amount of each camera parameter may be x [%] of the currently set value (however, x is an arbitrary real number). Further, when the adjustment direction that is the same as the previous adjustment direction is received, the parameter change amount determination unit 204 may set the parameter values to be inclined values obtained by the calculation of 2×[%] of the currently set value or to be random numbers.

The camera unit 201 resumes shooting based on the camera parameters set by the parameter change amount determination unit. Then, the camera parameters are adjusted repeatedly until the conditions are met in the determination unit 202.

As described above with reference to FIGS. 3 and 4, when all the conditions for the determination unit 202 are met, the process of the adjustment ends.

As described above, according to the image pick-up apparatus according to the second example embodiment, whether or not the picked-up image is an image suitable for a computer vision application is determined by a plurality of determination methods, and by determining the parameter adjustment direction and the items for determination based on the determination for which the conditions are not met, the camera parameters can be adjusted properly, and accuracy of the localization can be improved when picking up an image for performing localization.

For instance, even by using a camera installed in a smartphone or a simple webcam, accuracy of the generation of the SLAM map by the Visual SLAM which is the target computer vision application, in particular, the Visual SLAM using the direct method, can be improved.

First Example

Hereinbelow, the specific examples of adjustment of the camera parameters according to the second example embodiment will be described.

It is assumed that adjustment of the camera parameters according to the second example embodiment using a camera installed in a smartphone is performed. Note that adjustment of the camera parameters is assumed to be performed by running an application that runs on a smartphone. The target computer vision application is assumed to be the Visual SLAM of a direct method, and the camera parameters to be adjusted are assumed to be the exposure time and the ISO sensitivity.

It is assumed that in the initial state, the auto tuning function of a camera installed in a smart phone is turned-off, the exposure time of the camera parameter is 10 [ms], and the ISO sensitivity is 100[–], and the user activates the camera installed in the smartphone and starts moving.

An image shot by the camera unit 201 with the default camera parameters is transmitted to the determination unit 202.

The determination unit 202 performs a convolution operation on the received image using the Laplacian kernel which is famous as the blur determination and calculates the variance value. When the variance value calculated by the blur determination is smaller than a certain threshold value, it is determined that a blur is detected in the received image. The threshold value at this time is any value, for instance, 60.0. When the variance value calculated by the blur determination is equal to or higher than the threshold value, the next determination is performed.

Next, as the random noise determination, Canny detection is performed, and when the points and not the lines are present by a number equal to or higher than the threshold value, it is determined that a random noise is detected in the picked-up image that has been received. In this case, the threshold value may be any value, for instance, 10. When the number of points obtained by the random noise determination is less than the threshold value, the next determination is performed.

Finally, as the edge determination, similarly to the blur determination, a convolution operation using the Laplacian kernel is performed and the variance value is calculated. When the variance value calculated by the edge determination is smaller than a certain threshold value, it is determined that the received image has failed in the edge determination. The threshold value at this time is any value, for instance, 150.0. When the variance value calculated by the edge determination is equal to or higher than the threshold value, the determination unit 202 satisfies the conditions and adjustment of the camera parameters ends.

As a result of the determination performed by the determination unit 202, when a blur is detected, the parameter adjustment direction determination unit 203 determines the parameter adjustment direction to be in the direction for decreasing the exposure time [ms] of the camera parameters.

Next, the parameter change amount determination unit 204 determines the decrease amount of the exposure time [ms]. As a method of determining the change amount, any method may be adopted as described above, but herein, 5 [ms] is selected as a random number. Since the current set value of the exposure time is 10 [ms], the parameter change amount determination unit sets the camera parameter of the exposure time to be 10 [ms]−5 [ms]=5 [ms] in the camera unit 201.

The camera unit 201 transmits the image it has shot with the exposure time being set to 5 [ms] to the determination unit 202.

The determination unit 202 performs the blur determination, the random noise determination, and the edge determination again on the received image, and repeats the aforementioned adjustment procedure until the conditions are met.

Note that in the aforementioned description, determination by the determination unit 202 is performed in the order of the blur determination, the random noise determination, and the edge determination, however the order of the determination procedure is not particularly limited to this order. Further, the algorithm used for each determination may be any algorithm.

Third Example Embodiment

Figure 5:
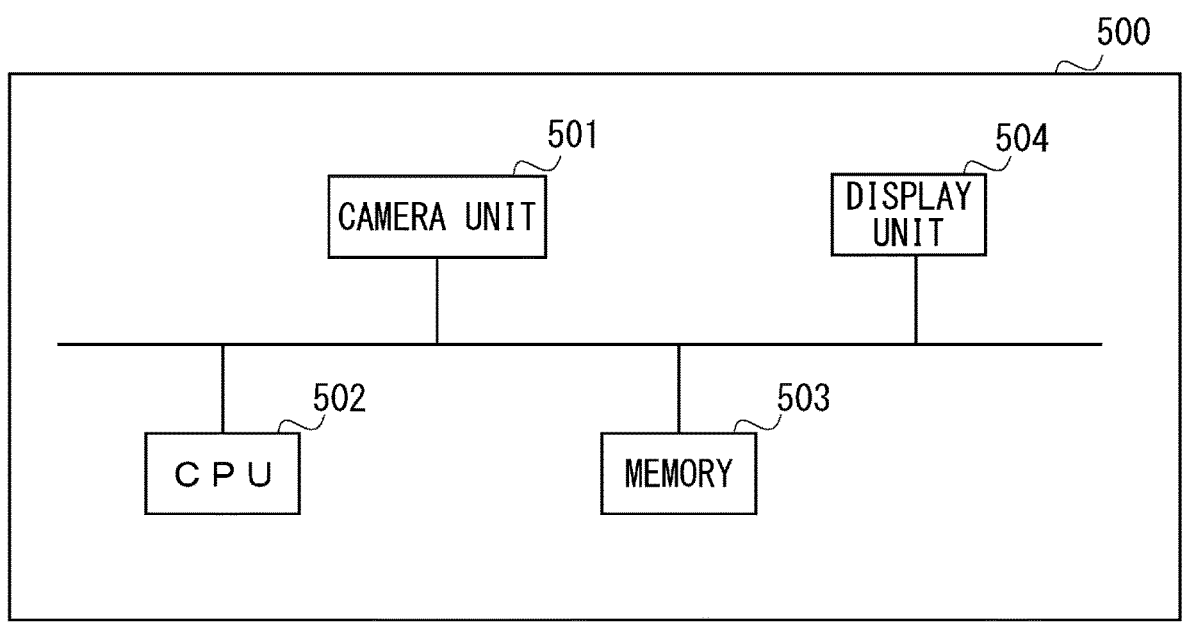
FIG. 5 is block diagram showing a schematic configuration of an image pick-up apparatus according to a third example embodiment.

In a third example embodiment, an example of a hardware configuration that realizes the first example embodiment and the second example embodiment will be described. FIG. 5 is a block diagram showing a schematic configuration of an image pick-up apparatus according to a third example embodiment.

In FIG. 5, an image pick-up apparatus 500 includes a camera unit 501, a CPU 502, a memory 503, and a display unit 504.

The camera unit 501 is an image pick-up unit for which the camera parameters such as the focus and the exposure time of the image pick-up apparatus are adjustable. For instance, the camera unit 501 includes a lens, a diaphragm, a shutter, and an image pick-up device. Then, the camera unit 501 converts light received by the image pick-up device to an electrical signal and outputs the signal to the CPU 502 and the memory 503.

The CPU 502 is a processor that executes each processing performed by the determination unit 102 and the parameter adjustment unit 103 according to the first example embodiment and the determination unit 202, the parameter adjustment direction determination unit 203, and the parameter change amount determination unit 204 according to the second example embodiment.

The memory 503 is a memory for storing the data of the picked-up image, the parameters, and numerical values used in the calculation and the determination. For instance, the memory 503 is a RAM (Random Access Memory) and a ROM (Read Only Memory).

The display unit 504 is a display device for displaying the picked-up image and the result of the localization. For instance, the display unit 504 may be an LCD (Liquid Crystal Display).

According to the configuration described above, the image pick-up apparatus according to the first example embodiment and the image pick-up apparatus according to the second example embodiment can be implemented as hardware. Further, the image pick-up apparatus according to the first example embodiment and the image pick-up apparatus according to the second example embodiment also can be implemented as programs stored in the memory 503, which can be run on the CPU 502.

Note that the present disclosure is not limited to the above-described example embodiments, and various modifications can be made without departing from the sprit and the scope of the present disclosure.

Each element shown in the drawings as functional blocks that perform various processing can be configured of a CPU, a memory, and other circuits in terms the hardware configuration thereof, and can be realized by programs loaded in a memory in terms of the software configuration thereof. Therefore, it is understood by one skilled in the art that these functional blocks are realized by the hardware configuration, the software configuration, or the combination of the hardware configuration and the software configuration, and it is not to be limited to any of these configurations.

Further, the aforementioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (Erasable PROM), flash ROM, RAM (random access memory)). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

This application is based upon and claims the benefit of priority from Japanese patent application No. 2019-96938, filed on May 23, 2019, the disclosure of which is incorporated herein in its entirety by reference.

REFERENCE SIGNS LIST 100, 200, 500 IMAGE PICK-UP APPARATUS
101, 201 CAMERA UNIT
102, 202 DETERMINATION UNIT
103 PARAMETER ADJUSTMENT UNIT
203 PARAMETER ADJUSTMENT DIRECTION DETERMINATION UNIT
204 PARAMETER CHANGE AMOUNT DETERMINATION UNIT
501 CAMERA UNIT
503 MEMORY
504 DISPLAY UNIT

What is claimed is:

1. An image pick-up apparatus comprising at least one memory configured to store an instruction, and at least one processor configured to execute the instruction, the processor being further configured to:
   pick-up an image;
   perform a determination that includes at least one of edge determination, blur determination, or noise determination on the image;
   determine an adjustment direction of a camera parameter based on the determination;
   determine a change amount of the camera parameter based on the determination; and
   adjust the camera parameter based on the adjustment direction and the change amount.

2. The image pick-up apparatus according to claim 1, wherein the at least one processor is further configured to:
   perform at least two of the edge determination, the blur determination, or the noise determination on the image;
   determine the adjustment direction of the camera parameter based on items of determination for which conditions are not met; and
   determine the change amount of the camera parameter based on the items of determination for which the conditions are not met.

3. An image pick-up method comprising:
   picking-up an image;
   performing a determination that includes at least one of edge determination, blur determination, or noise determination on the image;
   determining an adjustment direction of a camera parameter based on the determination;
   determining a change amount of the camera parameter based on the determination; and
   adjusting the camera parameter based on the adjustment direction and the change amount.

4. A non-transitory computer-readable storage medium storing a program for causing a computer to perform:
   picking-up an image;
   performing a determination that includes at least one of edge determination, blur determination, or noise determination on the image;
   determining an adjustment direction of a camera parameter based on the determination;
   determining a change amount of the camera parameter based on the determination; and adjusting the camera parameter based on the adjustment direction and the change amount.

\* \* \* \* \*